July 13, 1954  A. A. L. GIRARD  2,683,505
VISCOSITY COMPENSATOR FOR HYDRAULIC SHOCK ABSORBERS
Filed Feb. 5, 1952  2 Sheets-Sheet 1
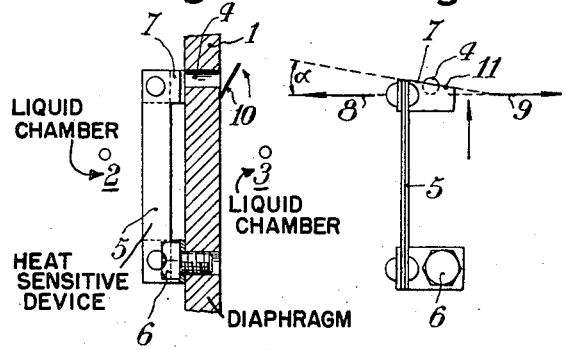
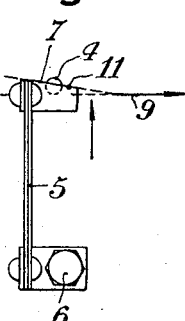
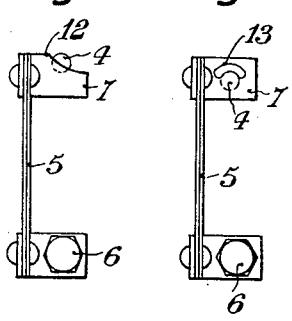
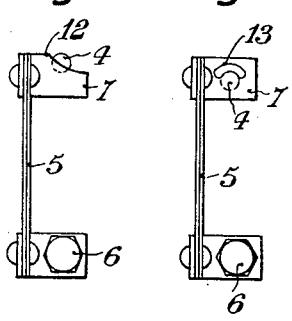
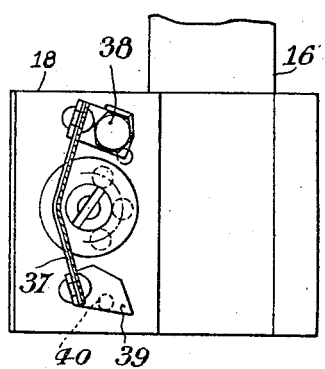
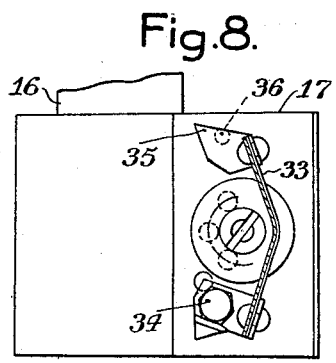
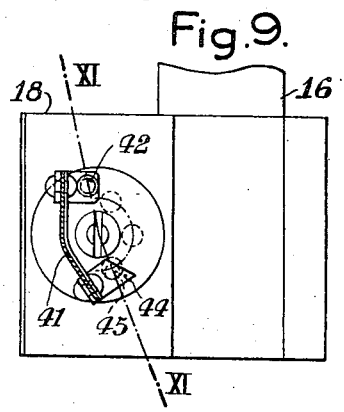
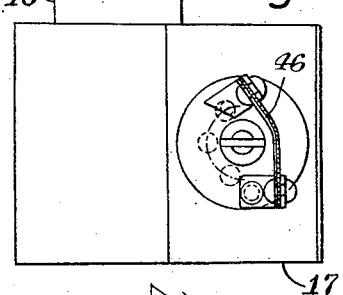
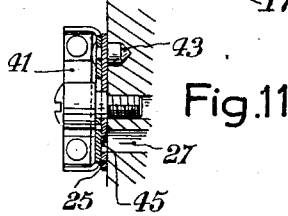
Inventor
Alexandre Auguste Léon Girard
By Robert E Burns
Attorney July 13, 1954  A. A. L. GIRARD  2,683,505
VISCOSITY COMPENSATOR FOR HYDRAULIC SHOCK ABSORBERS
Filed Feb. 5, 1952  2 Sheets-Sheet 2

Inventor
Alexandre Auguste Léon Girard
By Robert E. Burns
Attorney

Patented July 13, 1954

2,683,505

UNITED STATES PATENT OFFICE 2,683,505

VISCOSITY COMPENSATOR FOR HYDRAULIC SHOCK ABSORBERS

Alexandre Auguste Léon Girard, Saint-Cloud, France

Application February 5, 1952, Serial No. 270,019

Claims priority, application France February 8, 1951

3 Claims. (Cl. 188—89)

Devices are already known which operate on the principle of linear or volumetric expansion for the purpose of more or less obturating an orifice so as to maintain a liquid flowing therethrough at a nearly constant output value dependent upon a given pressure and a known law governing the viscosity of this liquid. In devices of this type materials are used the linear or volumetric variations of which in relation to the temperature are extremely small and lead to precarious and costly forms of embodiments. Moreover, devices of this type undergo excessive expansion and contraction stresses.

It is the scope of this invention to utilize for the above-specified purpose the properties of thermocouples the deflection of which is considerable for a relatively small differential temperature. With this purpose in view, use is made of a device which is simple and accurate in operation and cheap to manufacture. Besides, the bending stresses necessitated by the operation of this device are extremely low.

For this purpose the device according to the invention for compensating the variations in viscosity of the liquid contained in the chambers of a hydraulic shock-absorber comprises obturating plates adapted to slide along the wall of diaphragms separating the various chambers and positioned in the vicinity of connecting orifices bored in these diaphragms, and a thermostatic device adapted to control the sliding movement of each plate in order more or less to obturate the connecting orifice adjacent to the plate, thereby automatically adjusting the cross-sectional area of the connecting passage to a predetermined value for each liquid temperature.

The attached drawings forming part of this specification illustrate diagrammatically by way of example a few embodiments of the invention and a typical form of an application thereof to a hydraulic shock-absorber. In the drawings:

Figures 1 and 2 are a fragmentary sectional view and a front view, respectively, of a first embodiment of the device for controlling the connecting orifice bored in the diaphragm of a hydraulic shock-absorber.

Figures 3 and 4 are modified forms of the embodiment illustrated in Fig. 2.

Figures 7 and 8 show details of the shock-absorber of Fig. 6, seen according to the arrows A and B of Fig. 6.

Figures 9 and 10 are modified embodiments of the devices illustrated in Figures 7 and 8.

Figure 11 is a detail view in section, taken upon the line XI—XI of Fig. 9.

Figure 6:
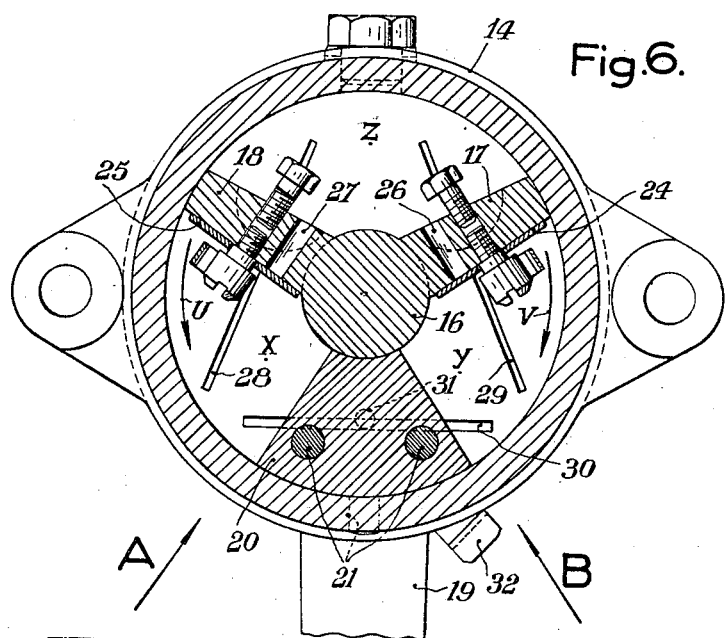
Figure 6 is a sectional view taken upon the line VI—VI of Figure 5.
Figure 5:
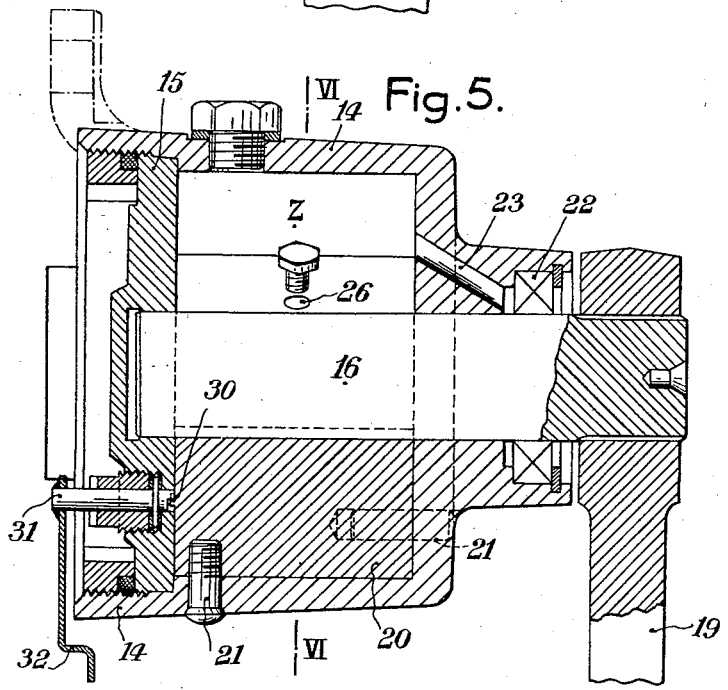
Figure 5 is a sectional view of a shock-absorber provided with the compensator according to the invention.

Referring to the drawings, Figs. 1 and 2 illustrate a diaphragm 1 separating two chambers 2, 3 containing a liquid. In chamber 2 this liquid is under pressure whereas in chamber 3 the liquid is constantly at a pressure either lower or equal to that of the liquid in chamber 2.

These chambers 2, 3 communicate with each other through an orifice 4.

A thermostatic device or thermocouple 5 consisting as already known of a pair of strips of dissimilar metals having different coefficients of expansion is fixed in the chamber 2 to the wall 1 through any suitable means 6. The free end of the device carries an obturating plate 7 fast therewith. This plate 7 is adapted to more or less obturate the orifice 4. According to the change in temperature in the chamber the free end of the thermocouple will move in either direction 8 or 9 so that the plate 7 fast therewith will modify accordingly the cross-sectional area of the orifice 4 which is available for the liquid to pass therethrough. As the pressure in the chamber 2 is constantly higher than or at least equal to that in chamber 3, the liquid will flow from chamber 2 to chamber 3 through that sectional portion of the orifice 4 which is not obturated by the plate 7. This plate 7 is urged against the wall 4 by the differential pressure existing between chambers 2 and 3. As a consequence, the thermocouple 5 will have to overcome the frictional resistance set up between plate 7 and wall 1 for moving from one position to another, this movement occurring only provided that the pressure acting upon the diaphragm 1 is not excessive. However, as long as the pressure in chamber 2 equals that in chamber 3 no frictional or other resistance will impede this movement of the thermocouple. Now, in a hydraulic shock-absorber as a rule compression chambers are under pressure every other stroke. As a consequence, the periodic recurrence of the zero pressure phase will permit the free movement of the thermostatic device.

In the foregoing it is assumed throughout that the pressure in chamber 2 is constantly equal to or higher than that in chamber 3. In certain applications there may be moments wherein the pressure in chamber 3 is higher than that in chamber 2. In this case, the diaphragm 1 should be protected by a one-way automatic valve 10 to prevent the liquid from flowing back to chamber 2.

According to the Figure 2 the angle α formed by the upper edge 11 of the thermocouple plate 7 with an axis at right angles to the bimetallic strip of the device 5 determines in accordance with the contour of the orifice 4 and with the law of thermostatic variation of the device the variation in the uncovered cross-sectional area of the orifice 4 according to the temperature of the liquid in which the device is immersed.

As illustrated in the modified embodiment of Fig. 3 the plate 7 may be formed with a shaped edge 12.

As illustrated in the other modified embodiment of Fig. 4 the plate 7 may be apertured by forming therein a port 13 of any suitable shape, in view of complementing the shape of the orifice provided in the diaphragm for the purpose set forth.

The plate 7 may be given a number of shapes combined with that of the contour of the orifice 4, so as to maintain a predetermined law of the useful cross-sectional area of the orifice relative to the deflection of the bimetallic strips of the thermocouple, that is, in relation to the temperature of the liquid of which it is desired to compensate the change in viscosity, without departing from the spirit and scope of the invention.

The device may be used for adjusting either the whole of the retarding orifices of a shock-absorber, or one or more additional orifices therein.

The orifice 4 is shown as having a circular contour, but any other shape may be resorted to, for instance square, triangular or elliptical. The bimetallic strip, which has a rectilinear shape in the example described above, may be V- or U-shaped, or semi-circular, spiral-shaped or have any other suitable profile.

Figures 5 to 11 illustrate a hydraulic shock-absorber of the rotary type embodying the invention and comprising a cylindrical casing 14 closed by a bottom plate 15. A shaft 16 carrying a pair of vanes 17 and 18 is mounted for pivotal movement about its axis in the casing 14 and actuated by a lever 19. The casing 14 is fast with the unsprung portion of the vehicle whereas the lever 19 is attached to the suspended portion of the vehicle, or vice versa.

The casing 14 is also formed with a fixed partition 20 secured to the casing by blind pins 21. With this arrangement the inner space of the casing is divided into three chambers X, Y, and Z, all filled with liquid. The necessary fluid-tightness of the assembly is ensured through a shaft packing 22 the inner face of which is connected through a passage 23 with the chamber Z.

The shaft vane 17 has fitted thereon a one-way automatic valve 24 so that liquid is only allowed to flow from chamber Z to chamber Y through ports 26; the other vane 18 is provided with a similar valve 25 whereby the liquid is permitted to flow from chamber Z to chamber X only through ports 27.

The bottom plate 15 is formed on the one hand with a groove 28 in front of which the vane 18 is caused to pass when the lever 19 and the shaft 16 fast therewith are moved, and on the other hand with a groove 29 in front of which the other vane 17 is caused to pass under the same conditions. A third groove 30 is also formed in the inner face of the bottom plate 15 and adapted to connect chamber X with chamber Y, the flow of liquid between these chambers being controlled by a cock 31 operated from the outside by means of lever 32.

In addition, as shown in Fig. 8, the vane 17 has mounted thereon a bimetallic strip device 33 fixed at 34 and carrying at its free end a plate 35 adapted to more or less obturate a passage 36 bored in the vane 17 for connecting chambers Y and Z to each other.

On the other hand, as shown in Fig. 7, the vane 18 is provided with a bimetallic strip device 37 fixed at 38 and carrying at its free end a plate 39 adapted to more or less obturate a port 40 formed in this vane 18 for connecting chambers X and Z to each other.

Assuming the vanes to move in the direction of the arrows U of Fig. 6 the liquid will be compressed in chamber X and part of it will be admitted into chamber Z through passage 28 and that portion of the orifice 40 which is not obturated by the plate 39 of the thermocouple device 37; another portion of the liquid from chamber X will enter chamber Y through passage 30. Therefore, the total amount of liquid escaped from chamber X is proportional with the uncovered portion of the cross-sectional area of port 40.

The liquid having run to chamber Z will flow back to chamber Y through holes 26 by opening the valve 24.

Similarly, when the vanes move in the direction of the arrow V the liquid is compressed within chamber Y and flows partly to chamber Z across that portion of port 36 which is not covered by the plate 35 of device 33 and through the passage 29, another portion of the liquid from chamber Y flowing to chamber X through passage 30. Thus, the total amount of liquid escaped from chamber Y is proportional with the uncovered portion of port 36.

Besides, the liquid admitted in chamber Z will flow back to chamber X through holes 27 by opening the valve 25.

Thus, in both cases the total amount of liquid circulated is dependent upon the position of plates 35 and 39 fast with the thermocouple devices 33 and 37 respectively, in relation to ports 36 and 40, and therefore upon the temperature of the liquid surrounding the bimetallic strips, since the positions of the obturating plates is conditioned by this temperature.

According to the modified embodiment of Figs. 9, 10 and 11, the bimetallic strip devices, instead of being fixed to the vanes, are fastened to the one-way valves 25 and 24. Thus, the heat responsive device 41 is secured at 42 to the valve 25 held against rotation by a stud 43 and the free end of the device 41 carries a plate 44 adapted to more or less obturate a port 45 formed in the valve and registering with a hole 27 bored through the vane 18. This arrangement operates as in the preceding example, the port 45 being more or less obturated when the chamber X is under pressure and the extent of this obturation being dependent upon the deflection of the bimetallic strip device, and therefore, upon the temperature of the liquid in the chambers.

The operation is identical in the case of chamber Y provided with a bimetallic strip device 46.

These thermostatic elements are mounted in pressure chambers X and Y only, since no pressure builds up in chamber Z.

These thermostatic devices may be positioned as well along the fixed partition wall 20, but as the chambers separated thereby are alternately under pressure, it would be necessary to protect the obturating plates of the thermocouples by fitting a one-way valve acting the same as valve 10 of Fig. 1 at the outlet end of each port.

Of course, the devices described hereinabove may be utilized in any other types of shock-absorbers besides that illustrated by way of example in the drawings, notably shock-absorbers the vanes of which are moved along rectilinear paths.

What I claim is:

1. A hydraulic damper for retarding the relative oscillations between two assemblies, said retarding effect having a strength independent of temperature conditions, said damper comprising two rigid vane systems driven from said two oscillating assemblies respectively, said vanes of said systems forming a plurality of chambers comprising in turn two compression chambers each having an inner partition defining a variable volume, a liquid filling completely both said compression chambers and, at least partially, another chamber, one of said partitions having formed therein an inlet hole for admitting said liquid into each compression chamber, a one-way valve constituting one portion of the inner wall of each of said compression chambers, mounted against said inlet hole in said compression chamber and adapted to prevent the liquid from flowing out of the chamber through said inlet hole, the inner wall of said compression chamber having formed therein an outlet orifice, a substantially flat bimetallic strip element having one end secured to the inner wall of said compression chamber and an edge engaging the inner wall of said compression chamber, said bimetallic strip element extending along said inner wall of said compression chamber in a plane substantially at right angles to said inner wall and having a free end movably responsive to any variations in the temperature of the liquid filling said compression chamber and a plate member secured to said free end, bearing against said inner wall of said compression chamber in the vicinity of said outlet orifice and slidably engaging said inner wall of said compression chamber, said plate member having one portion of varying surface positioned in front of said outlet orifice.

2. A hydraulic damper for retarding the relative oscillating motion between two assemblies, said retarding effect having a strength independent of temperature conditions, said damper comprising two rigid vane systems driven from said two oscillating assemblies respectively, said vanes of said systems forming a plurality of chambers comprising in turn two compression chambers each having an inner partition defining a variable volume, a liquid filling completely both said compression chambers and, at least partially, another chamber, one of said partitions having formed therein an inlet hole for admitting said liquid into each compression chamber, a one-way valve constituting one portion of the inner wall of each of said compression chambers, mounted against said inlet hole in said compression chamber and adapted to prevent the liquid from flowing out of the chamber through said inlet hole, the inner wall of said compression chamber being formed with an outlet orifice through which the liquid can flow from said compression chamber to said other chamber, a substantially flat bimetallic strip element having one end secured to the inner wall of said compression chamber and an edge engaging the inner wall of said compression chamber, said bimetallic strip element extending along said inner wall of said compression chamber in a plane substantially at right angles to said inner wall and having a free end movably responsive to any variations in the temperature of the liquid filling said compression chamber and a plate member secured to said free end of said bimetallic strip element, said plate member bearing against said inner wall of said compression chamber in the vicinity of said outlet orifice and slidably engaging said inner wall of said compression chamber, said plate member having one portion of varying surface positioned in front of said outlet orifice, and another one-way valve mounted in the other compression chamber to prevent the liquid from penetrating into said compression chamber through said outlet orifice and exerting a pressure against that portion of said plate member which is positioned in front of said outlet orifice.

3. A hydraulic damper for retarding the relative oscillations between two assemblies, said retarding effect having a strength independent of temperature conditions, said damper comprising two rigid vane systems driven from said two oscillating assemblies respectively, said vanes of said systems forming a plurality of chambers comprising in turn two compression chambers each having an inner partition defining a variable volume, a liquid filling completely both said compression chambers and, at least partially, another chamber, one of said partitions having formed therein an inlet hole for admitting said liquid into each compression chamber, a one-way valve constituting one portion of the inner wall of each of said compression chambers, said one-way valve being mounted against said inlet hole in said compression chamber having formed therein an outlet hole registering with said inlet hole and being so arranged that said liquid cannot flow towards said inlet hole except through said outlet hole, a substantially flat bimetallic strip element having one end secured to said one-way valve and an edge disposed against said one-way valve, said bimetallic strip element extending along said one-way valve in a plane substantially at right angles to said one-way valve and having a free end movably responsive to any temperature variations in the liquid filling said compression chamber, and a plate member fixed to said free end, bearing against said one-way valve in the vicinity of said outlet orifice and slidably engaging said one-way valve, said plate member having one portion of varying surface positioned in front of said outlet orifice.

References Cited in the file of this patent

UNITED STATES PATENTS

| Number | Name | Date |
| --- | --- | --- |
| 435,678 | Blount | Sept. 2, 1890 |
| 1,119,013 | Hapgood | Dec. 1, 1914 |
| 1,876,092 | Sussin | Sept. 6, 1932 |
| 1,911,660 | Weckerly | May 30, 1933 |
| 2,004,904 | Peo et al. | June 11, 1935 |